US012776045B2

(12) United States Patent
Chae et al.

(10) Patent No.: US 12,776,045 B2
(45) Date of Patent: Oct. 27, 2026

(54) IMAGE PROCESSING SYSTEM, IMAGE PROCESSING METHOD, AND PROGRAM FOR FRAUD DETECTION

(71) Applicant: RAKUTEN GROUP, INC., Tokyo (JP)

(72) Inventors: Yeongnam Chae, Tokyo (JP); Mijung Kim, Tokyo (JP); Yuko Yoshida, Tokyo (JP); Ayana Taura, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 329 days.

(21) Appl. No.: 18/550,678

(22) PCT Filed: Nov. 28, 2022

(86) PCT No.: PCT/JP2022/043818

§ 371 (c)(1),
(2) Date: Sep. 14, 2023

(87) PCT Pub. No.: WO2024/116249

PCT Pub. Date: Jun. 6, 2024

(65) Prior Publication Data

US 2025/0078283 A1 Mar. 6, 2025

(51) Int. Cl.
*G06T 7/194* (2017.01)
*G06T 3/14* (2024.01)
*G06T 7/90* (2017.01)

(52) U.S. Cl.
CPC ................ *G06T 7/194* (2017.01); *G06T 3/14* (2024.01); *G06T 7/90* (2017.01)

(58) Field of Classification Search
CPC ........... G06T 7/194; G06T 7/00; G06T 7/001; H04N 1/00843; H04N 1/00045; H04N 2201/0005
USPC .......................................................... 382/115
See application file for complete search history.

(56) References Cited

U.S. PATENT DOCUMENTS

2020/0317673 A1* 10/2020 Kim .................... A61K 31/519
2021/0281748 A1 9/2021 Nogami et al.

FOREIGN PATENT DOCUMENTS

CN 112613346 A 4/2021
EP 3522072 A1 8/2019
JP 2019003421 A * 1/2019
JP 2020-087460 A 6/2020
JP 2020-088647 A 6/2020
JP 2022-058211 A 4/2022
(Continued)

OTHER PUBLICATIONS

Albert B. Centeno et al; "Identity Document and Banknote Security Forensics: A Survey"; Oct. 22, 2019; Cornell University Library (Year: 2019).*
(Continued)

*Primary Examiner* — Jamares Q Washington
(74) *Attorney, Agent, or Firm* — HEA Law PLLC

(57) ABSTRACT

An image processing system, comprising at least one processor configured to: acquire a target image showing a target foreground that is a foreground being an estimation target for fraud and a target background being a background of the target foreground; and estimate fraud relating to the target foreground based on the target background shown in the target image.

15 Claims, 10 Drawing Sheets

(56) References Cited

FOREIGN PATENT DOCUMENTS

| | | | | |
|---|---|---|---|---|
| SG | 10202005117 P | | 2/2021 | |
| WO | WO-2024024986 A1 | * | 2/2024 | ............. H04N 23/60 |

OTHER PUBLICATIONS

International Search Report of Dec. 27, 2022, for International Patent Application PCT/JP2022/043818, pp. 1-12 (See the transmittal letter).
Search Report of Apr. 29, 2024, for corresponding EP Patent Application No. 22930174.2, pp. 1-8.
Office Action of May 15, 2024, for corresponding TW Patent Application No. 112144280, pp. 1-6.

* cited by examiner

FIG.7

DB

| REFERENCE IMAGE | FRAUD DATE AND TIME | NUMBER OF TIMES OF FRAUD | REFERENCE BACKGROUND TYPE | REFERENCE FOREGROUND TYPE |
|---|---|---|---|---|
| 00001.jpg | 2022/10/13 10:24:25 | 4 | TOWEL | DRIVER'S LICENSE |
| 00002.jpg | 2022/10/13 10:24:30 | 12 | FLOORING | DRIVER'S LICENSE |
| 00003.jpg | 2022/10/13 10:24:36 | 8 | TOWEL | PERSONAL IDENTIFICATION NUMBER CARD |
| 00004.jpg | 2022/10/13 10:24:52 | 25 | DESK | INSURANCE CARD |
| 00005.jpg | 2022/10/13 10:25:15 | 14 | CARDBOARD | DRIVER'S LICENSE |
| ⋮ | ⋮ | ⋮ | ⋮ | ⋮ |

IMAGE PROCESSING SYSTEM, IMAGE PROCESSING METHOD, AND PROGRAM FOR FRAUD DETECTION

CROSS REFERENCE TO RELATED APPLICATIONS

This application is a National Stage of International Application No. PCT/JP2022/043818 filed on Nov. 28, 2022. The contents of the above document are incorporated herein by reference in its entirety.

TECHNICAL FIELD

The present disclosure relates to an image processing system, an image processing method, and a program.

BACKGROUND ART

There has been known a technology of estimating fraud relating to a foreground based on an image showing an object, such as a document or a product, as the foreground. For example, in Patent Literature 1, there is described a technology of estimating fraud relating to an identity verification document as follows. Specifically, after a user uploads to a server an image showing an identity verification document including a face photograph as a foreground and a face photograph showing the face taken on the spot, the server determines whether or not the face photograph in the identity verification document and the face photograph showing the face taken on the spot match each other or are similar to each other.

CITATION LIST

Patent Literature

[PTL 1] JP 2022-058211 A

SUMMARY OF INVENTION

Technical Problem

However, with the technology of Patent Literature 1, when a malicious user uses a face photograph showing the own face to falsify the identity verification document, the face photograph in the identity verification document shown in the image and the face photograph showing the face taken on the spot match each other or are similar to each other, and hence the fraud cannot be detected. Thus, with the related art, an estimation accuracy for the fraud relating to the foreground cannot be sufficiently increased.

One object of the present disclosure is to increase an estimation accuracy for fraud relating to a foreground.

Solution to Problem

According to one embodiment of the present disclosure, there is provided an image processing system including: a target image acquisition module configured to acquire a target image showing a target foreground that is a foreground being an estimation target for fraud and a target background being a background of the target foreground; and an estimation module configured to estimate fraud relating to the target foreground based on the target background shown in the target image.

Advantageous Effects of Invention

According to the present disclosure, the estimation accuracy for the fraud relating to the foreground is increased.

BRIEF DESCRIPTION OF DRAWINGS

FIG. 7 is a table for showing an example of a reference image database in the modification examples.

DESCRIPTION OF EMBODIMENT

[1. Overall Configuration of Image Processing System]

Figure 1:
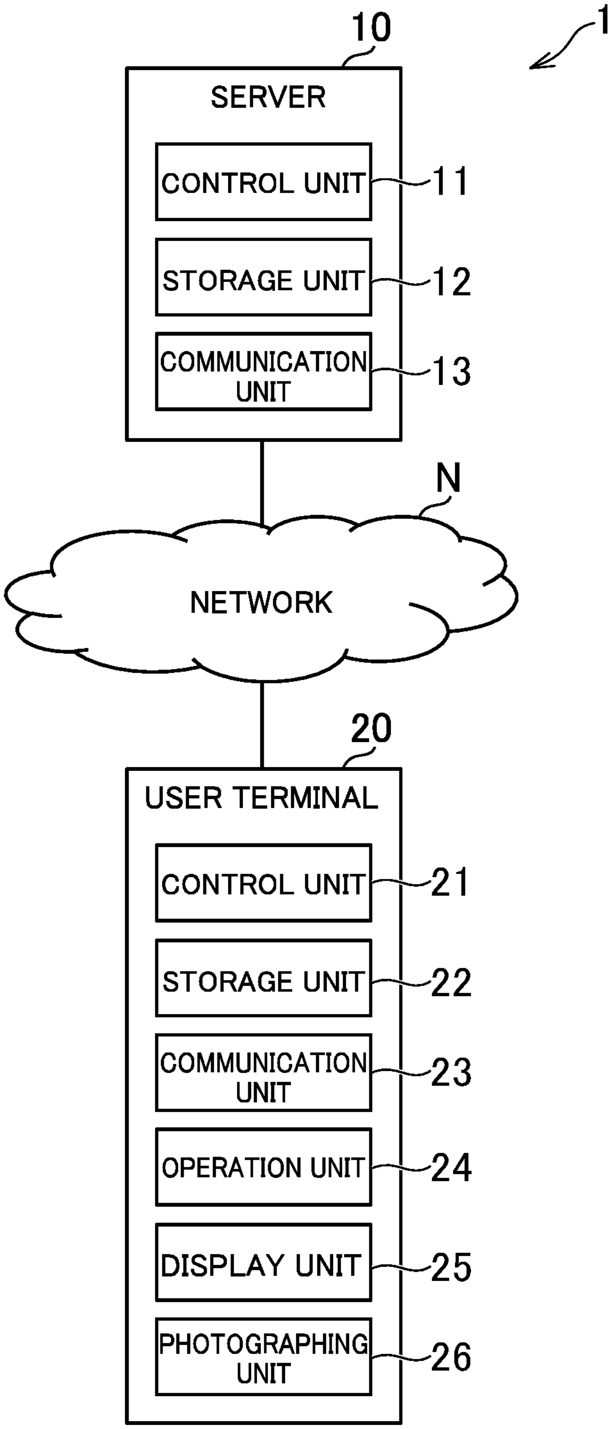
FIG. 1 is a diagram for illustrating an example of an overall configuration of an image processing system.

An example of an embodiment of an image processing system according to the present disclosure is described below. FIG. 1 is a diagram for illustrating an example of an overall configuration of the image processing system. For example, an image processing system 1 includes a server 10 and a user terminal 20. The server 10 and the user terminal 20 are connectable to a network N, which is the Internet, a LAN, or the like.

The server 10 is a server computer. For example, the server 10 includes a control unit 11, a storage unit 12, and a communication unit 13. The control unit 11 includes at least one processor. The storage unit 12 includes a volatile memory that is a RAM or the like and a non-volatile memory that is a flash memory or the like. The communication unit 13 includes at least one of a communication interface for wired connection or a communication interface for wireless communication.

The user terminal 20 is a computer of a user. For example, the user terminal 20 is a smartphone, a tablet terminal, a personal computer, or a wearable terminal. A control unit 21, a storage unit 22, and a communication unit 23 may have the same physical configurations as the physical configurations of the control unit 11, the storage unit 12, and the communication unit 13, respectively. An operation unit 24 is an input device such as a touch panel. A display unit 25 is a liquid crystal display or an organic EL display. A photographing unit 26 includes at least one camera.

Programs stored in the storage units 12 and 22 may be supplied via the network N. At least one of the server 10 or the user terminal 20 may include a reading unit (for example, an optical disc drive or a memory card slot) for reading a computer-readable information storage medium, or an input/output unit (for example, a USB port) for data input from/output to an external device. For example, a program stored on an information storage medium may be supplied via the reading unit or the input/output unit.

Moreover, the image processing system 1 is only required to include at least one computer, and is not limited to the example of FIG. 1. For example, the image processing system 1 may include only the server 10, and may not include the user terminal 20. In this case, the user terminal 20 exists outside the image processing system 1. The image processing system 1 may include only the user terminal 20, and may not include the server 10. In this case, the server 10 exists outside the image processing system 1. The image processing system 1 may include at least one computer other than the server 10 and the user terminal 20. In this case, the server 10 and the user terminal 20 exist outside the image processing system 1.

[2. Overview of Image Processing System]

This embodiment takes as an example a case in which the image processing system 1 estimates fraud in electronic know your customer (eKYC). Here, the ekYC is identity verification executed electronically. Any service can use the eKYC. For example, the ekYC is usable in a communication service, a financial service, electronic an settlement service, an electronic commerce service, an insurance service, or a government service. The image processing system 1 can be applied to a scene other than the eKYC. For example, the image processing system 1 can also be applied to KYC, which is not classified into the eKYC. The image processing described in this embodiment can also be applied to a scene other than the identity verification.

In the ekYC, identity verification which uses an identity verification document (identification) is executed. The identity verification document is a document which can verify the identity. In this embodiment, a driver's license is described as an example of the identity verification document. The identity verification document is a type of an official document. The identity verification document may be of any type, and is not limited to the driver's license. For example, the identity verification document may be a personal identification number card, an insurance card, a certificate of residence, or a passport.

For example, a malicious user may try to breach the ekYC through use of a fraudulent identity verification document. The fraud in this case is use of a falsified identity verification document, use of an identity verification document of another person without permission, or use of a copy thereof. Accordingly, the image processing system 1 estimates whether or not the identity verification document is fraudulent based on an image showing the identity verification document. The identity verification document being an estimation target for the fraud is hereinafter referred to as "target foreground." An image showing the target foreground is referred to as "target image." A background shown in the target image is referred to as "target background."

Figure 2:
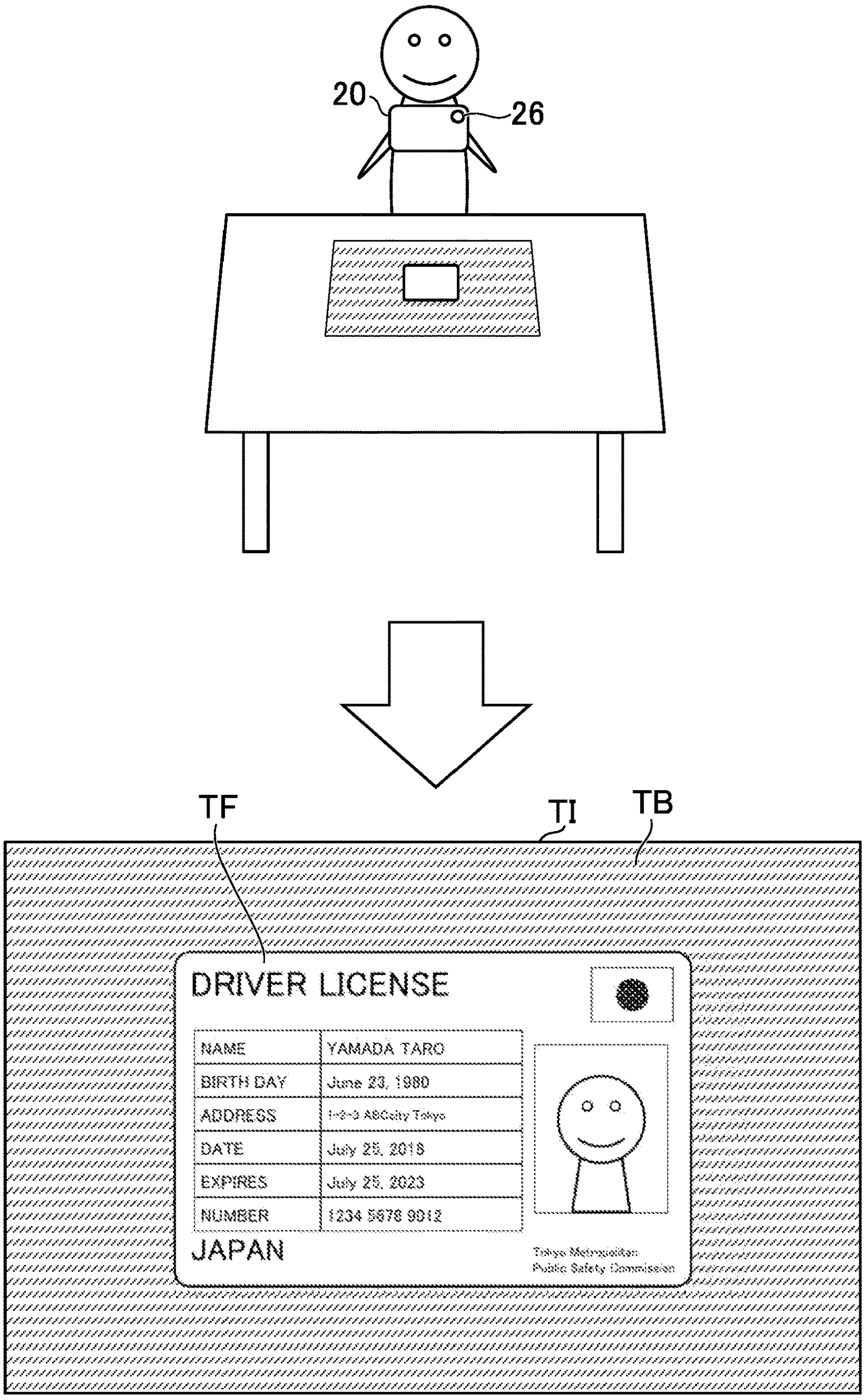
FIG. 2 is a view for illustrating an example of a scene in which a user captures a target foreground.

FIG. 2 is a view for illustrating an example of a scene in which a user captures the target foreground. In the example of FIG. 2, a target foreground TF is a fictitious driver's license. A target background TB is a towel. For example, when the user captures the driver's license arranged on the towel with the photographing unit 26, the user terminal 20 acquires a target image TI generated by the photographing unit 26. In the target image TI, the target foreground TF being the driver's license and the target background TB being a part of the towel are shown. The user terminal 20 transmits the target image TI to the server 10. When the server 10 receives the target image TI, the ekYC is executed. As the ekYC itself, a publicly-known method can be used.

For example, it is assumed that a malicious user arranges a plurality of falsified driver's licenses on the towel, successively captures the driver's licenses, and successively uploads the plurality of target images TI. In this case, in each of the plurality of target images TI, similar towel cloths are shown as the target background TB. As described above, a fraudulent target foreground TF may be shown in the target image TI showing a specific target background TB, and hence the target background TB is considered as information useful in estimating the fraud. Thus, the image processing system 1 estimates the fraud by focusing on the target background TB.

Figure 3:
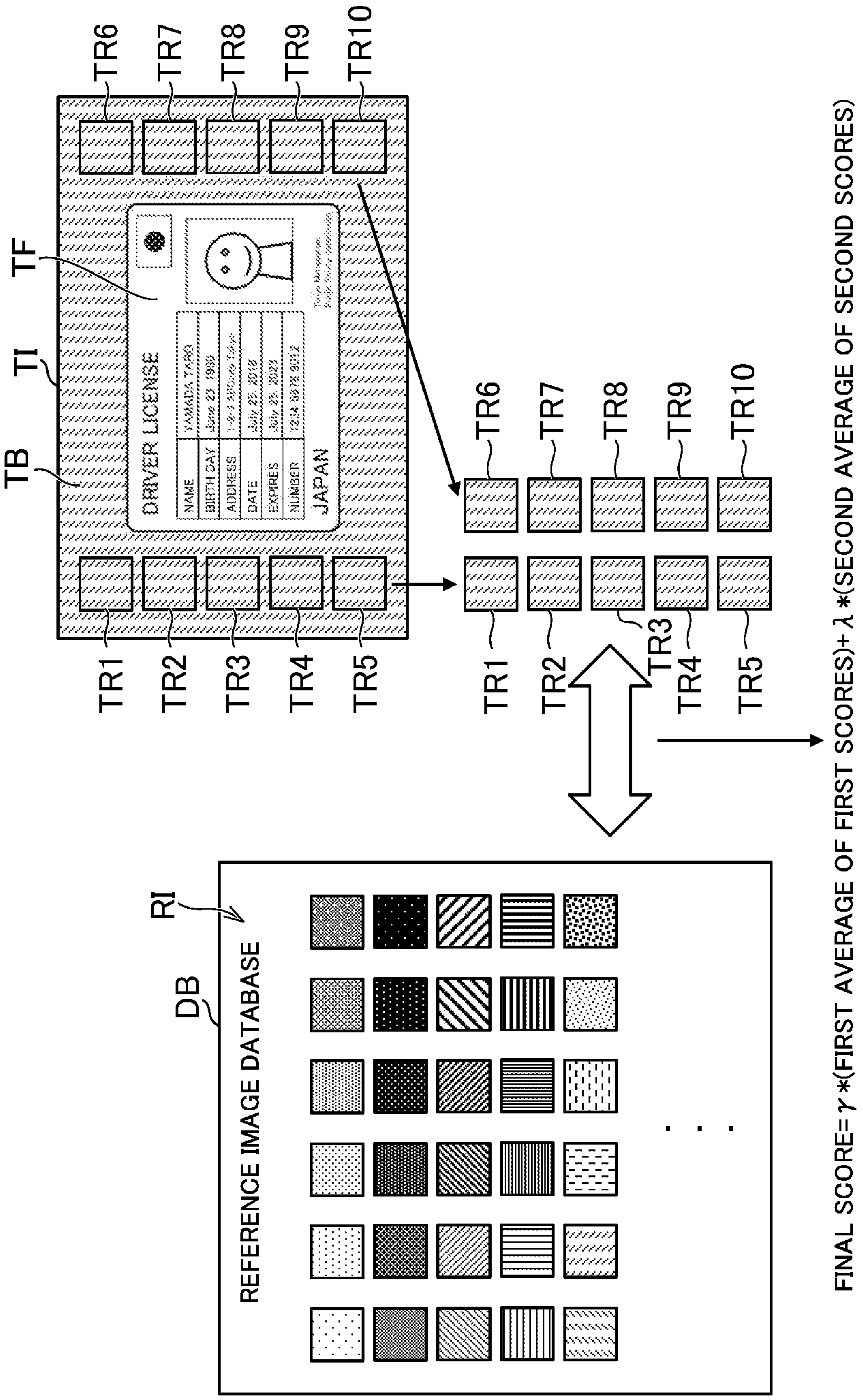
FIG. 3 is a diagram for illustrating an example of processing executed by the image processing system.

FIG. 3 is a diagram for illustrating an example of processing executed by the image processing system 1. For example, the server 10 stores a reference image database DB which stores a plurality of reference images RI. The reference images RI are images referred to in order to estimate the fraud. In this embodiment, the reference image RI shows a background in an image showing an actually uploaded fraudulent identity verification document. A fraudulent identity verification document is hereinafter referred to as "fraudulent foreground." A background of the fraudulent foreground is referred to as "fraudulent background." An image showing the fraudulent foreground and the background is referred to as "fraudulent image."

For example, it is assumed that a malicious user captures a fraudulent foreground arranged on a towel being a fraudulent background, and then uploads a fraudulent image. In this case, the reference image RI is created by cutting out a portion of the fraudulent image in which the fraudulent background is shown. For example, when a fraudulent image in which another fraudulent background, such as a flooring, a desk pad, a mat, a carpet, bedding, a desk, a box, or a sofa, is shown is uploaded, the reference image RI showing this another fraudulent background is created. It is assumed that reference images RI showing various fraudulent backgrounds are stored in the reference image database DB.

For example, when the server 10 receives the target image TI from the user terminal 20, the server 10 acquires target regions TR1 to TR10 showing the target background TB from the target image TI. In the example of FIG. 3, the target regions TR1 to TR5 are acquired from a left side of the target foreground TF, and the target regions TR6 to TR10 are acquired from a right side of the target foreground TF. When the target regions TR1 to TR10 are not distinguished from one another, the target regions TR1 to TR10 are hereinafter simply referred to as "target regions TR." The number of target regions TR may be any number, and is not limited to 10. For example, the number of target regions TR may be one to nine, or eleven or more.

For example, the server 10 calculates a first score and a second score relating to similarity between the target regions TR and the reference images RI based thereon. In this embodiment, the first score indicates similarity in terms of pattern. In principal, similarity in terms of color has no influence on the first score, or has low influence on the first score. For example, the first score is calculated through use of a Gabor filter. The second score indicates similarity in terms of color. In principal, similarity in terms of pattern has no influence on the second score, or has low influence on the second score. For example, the second score is calculated through use of a color histogram.

For example, the server 10 calculates the first score and the second score for each of combinations between the target regions TR and the reference images RI. Thus, when the number of target regions TR is "k" ("k" is a natural number)

and the number of reference images RI is "n" ("n" is a natural number), the server 10 calculates k×n first scores and k×n second scores. The server 10 calculates a first average being an average of the k×n first scores and a second average being an average of the k×n second scores.

For example, the server 10 calculates a final score by adding a value obtained by multiplying the first average by a coefficient γ (γ is a numerical value equal to or larger than 0) and a value obtained by multiplying the second average by a coefficient λ (λ is a numerical value equal to or larger than 0). In this embodiment, a case in which each of the coefficients γ and λ is 0.5 is described, but each of the coefficients γ and λ may be any numerical value. For example, the coefficient γ may be any value of from 0.01 to 0.99, and the coefficient λ may be a value obtained by subtracting γ from 1. A sum of the coefficients γ and λ may be a value other than 1. It is assumed that the coefficients γ and λ are specified by an administrator of the image processing system 1. The final score indicates an overall similarity between the plurality of target regions TR and the plurality of reference images RI.

In this embodiment, a higher first score and a higher second score mean a higher degree of similarity. That is, a lower first score and a lower second score mean a lower degree of similarity. Thus, a higher final score means a higher degree of similarity. That is, a lower final score means a lower degree of similarity. For example, when the final score is equal to or higher than a threshold value, the server 10 estimates that the target foreground TF is fraud.

It is only required that a correlation exist between the first score and the second score and the degree of similarity, and this correlation is not limited to the example in this embodiment. For example, a higher first score and a higher second score may mean a lower degree of similarity. That is, a lower first score and a lower second score may mean a higher degree of similarity. In this case, a lower final score means a higher degree of similarity. That is, a higher final score means a lower degree of similarity.

Moreover, a lower first score may mean a higher degree of similarity, and a higher second score may mean a lower degree of similarity. That is, a higher first score may mean a lower degree of similarity, and a lower second score may mean a higher degree of similarity. When the first score is calculated through use of the Gabor filter and the second score is calculated through use of the color histogram, the correlation described above may be provided depending on a calculation method. In this case, it is only required to calculate the final score after a reciprocal of the value of any one of the first score and the second score or a difference of this value from a predetermined value is calculated.

In contrast, a higher first score may mean a higher degree of similarity, and a lower second score may mean a higher degree of similarity. That is, a lower first score may mean a lower degree of similarity, and a higher second score may mean a lower degree of similarity. Also in this case, it is only required to calculate the final score after a reciprocal of the value of any one of the first score and the second score or a difference of this value from a predetermined value is calculated.

In this embodiment, it is assumed that a target image TI having a relatively high final score is set as a target of a manual check preferentially over a target image TI having a relatively low final score. The manual check is a visual check by human eyes. As described above, the image processing system 1 according to this embodiment estimates whether or not the target foreground TF is fraud based on the target background TB shown in the target image TI, to thereby increase the estimation accuracy for the fraud. Details of the image processing system 1 is now described.

[3. Functions Implemented in Image Processing System]

Figure 4:
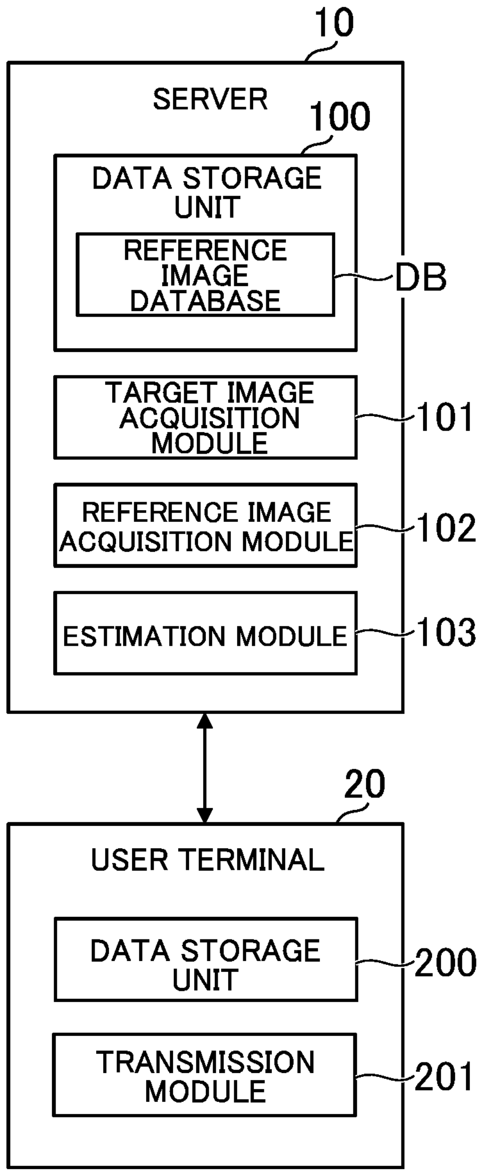
FIG. 4 is a function block diagram for illustrating an example of functions implemented in the image processing system.

FIG. 4 is a function block diagram for illustrating an example of functions implemented in the image processing system 1.

[3-1. Functions Implemented in Server]

The server 10 includes a data storage unit 100, a target image acquisition module 101, a reference image acquisition module 102, and an estimation module 103. The data storage unit 100 is implemented by the storage unit 12. The target image acquisition module 101, the reference image acquisition module 102, and the estimation module 103 are implemented by the control unit 11.

[Data Storage Unit]

The data storage unit 100 stores data required for the estimation of the fraud. For example, the data storage unit 100 stores a reference image database DB. In the reference image database DB, any number of reference images RI may be stored, and, for example, one to several tens, one hundred to several thousands, or a larger number of reference images RI may be stored in the reference image database DB. In this embodiment, the reference image RI is created based on a fraudulent image. It is only required that at least one reference image RI be created from one fraudulent image, and a plurality of reference images RI may be created from one fraudulent image.

In this embodiment, it is assumed that the creation of the reference image RI is automated by a program prepared in advance, but the reference image RI may manually be created by the administrator of the image processing system 1. This program is hereinafter referred to as "creation program for the reference image RI." For example, in the creation program for the reference image RI, separation processing of separating a portion of a fraudulent background from a fraudulent image and acquisition processing of acquiring a reference image RI from this separated portion and storing the acquired reference image RI in the reference image database DB are defined. The creation program for the reference image RI is executed by the server 10 or another computer.

As the separation processing, publicly-known background separation processing can be used. For example, the separation processing may include processing of detecting a contour of the fraudulent foreground from the fraudulent image through use of publicly-known contour extraction processing and processing of extracting a region outside the contour of the fraudulent foreground from the fraudulent image. When a plurality of fraudulent images continuously captured can be acquired, the separation processing may be processing of separating the fraudulent background through use of a background subtraction method.

The acquisition processing is processing of acquiring a region having a predetermined vertical width and a predetermined horizontal width from a predetermined position in the fraudulent background as the reference image RI. This embodiment takes as an example a case in which the vertical width and the horizontal width of the reference image RI and a vertical width and a horizontal width of the target region TR are the same, but at least one of the vertical width or the horizontal width of the reference image RI and at least one of the vertical width or the horizontal width of the target region TR may be different from each other. Moreover, the acquisition processing may include processing of executing image processing such as noise removal on a part of the fraudulent image extracted by the separation processing, to thereby acquire the reference image RI.

The data stored in the data storage unit 100 is not limited to the reference image database DB. The data storage unit 100 can store any data. For example, the data storage unit 100 may store a fraudulent image database in which each of a plurality of fraudulent images is stored. The data storage unit 100 may store a target image database in which each of a plurality of target images TI is stored. In the target image database, an estimation result obtained by the estimation module 103 may be stored.

[Target Image Acquisition Module]

The target image acquisition module 101 acquires the target image TI showing the target foreground TF which is the foreground being the estimation target for the fraud and the target background TB being the background of the target foreground TF. In this embodiment, a case in which the target image acquisition module 101 acquires the target image TI from the user terminal 20 is described, but the target image TI may be stored in the target image database in advance. The target image database may be stored in the data storage unit 100, or may be stored in a computer other than the server 10 or an external information storage medium. The target image acquisition module 101 may acquire the target image TI from the target image database.

This embodiment takes as an example a case in which the target foreground TF is the identity verification document, and the fraud is falsification of the identity verification document, but the target foreground TF may be an identity verification document other than the driver's license. Examples of the other identity verification document are as described above. The target foreground TF may be a foreground other than the identity verification document. The target foreground TF may be a document, such as a certificate, a receipt, a bill, an application, an in-house foreground, a government foreground, a financial statement, a newspaper, a magazine, another book, a signboard, a poster, or an advertisement, or a product traded in an electronic commerce service or a flea market service. The image processing system 1 can be applied to a scene in which fraud of any target foreground TF is to be estimated.

In this embodiment, the target image TI is an image generated by the photographing unit 26 capturing the target foreground TF. The target image TI may be a still image generated in a still image mode or individual images (frames) included in a motion image generated in a motion image mode. The target image acquisition module 101 may successively acquire a plurality of target images TI by successively capturing the target foregrounds TF. The target image acquisition module 101 may acquire e the target image TI generated by not the photographing unit 26, but other image generation means, such as a scanner, a copying machine, or a multifunction machine.

The target image TI is not limited to a photograph showing a state of an actual space, and may be a computer graphic or an image obtained by adding digital information such as a string to a photograph. When the target image TI is a computer graphic, the target foreground TF is an electronic foreground. The target background TB is an electronic background. The target image TI may be an image which is not classified into the computer graphic. For example, the target image TI may be an image generated by document creation software. The target image TI may be in any file format. For example, the target image TI is not required to be in a so-called image file format such as JPEG or PNG, or may be in a document file format such as PDF or another file format.

In this embodiment, the target foreground TF is a subject captured by the photographing unit 26. The target background TB is another object on which the subject is placed. In the example of FIG. 2, the towel corresponds to another object. It is only required that the another object be an object spread under the target foreground TF, and is not limited to the towel. For example, the another object may be another object, such as a flooring, a desk pad, a mat, a carpet, furniture, bedding, a desk, a box, or a sofa. In the target image TI, at least part of the another object is shown as the target background TB.

The target foreground TF is not required to be captured under the state in which the target foreground TF is placed on the another object. For example, the target foreground TF may be captured under a state in which the user holds the target foreground TF by hand, under a state in which the target foreground TF is suspended from something, or under a state in which the target foreground TF adheres to something. In this case, in the target image TI, the target background TB, such as a wall, a partition, furniture, an electrical appliance, a ceiling, a plant, or another scene, is shown. It is only required that the target background TB be a portion of the target image TI other than the target foreground TF, and those exemplified target backgrounds TB are possibly information useful for the estimation for the fraud.

[Reference Image Acquisition Module]

The reference image acquisition module 102 acquires the reference image RI showing the reference background being a background for reference. The reference background is a background to be referred to in order to estimate the fraud of the target foreground TF. The reference background can also be considered as a background to be compared with the target background TB. In this embodiment, the reference image RI is a portion of the fraudulent background of the fraudulent image showing the fraudulent foreground being a foreground which is fraudulent and the fraudulent background being a background of the fraudulent foreground. Thus, the case in which the reference background is the fraudulent background is exemplified.

The reference background may be a background other than the fraudulent background. That is, the reference background is not required to be the fraudulent background itself. For example, the reference background may be a background obtained by applying image processing such as the noise removal to the fraudulent background, a virtual background created through use of the computer graphics, or a background which is created through use of a machine learning model and looks like a real background. Moreover, for example, the reference background may be a background captured by the own camera of the administrator of the image processing system 1. It is only required that the reference background can serve as a reference at the time of the fraud estimation.

In this embodiment, the reference images RI are stored in the reference image database DB, and hence the reference image acquisition module 102 acquires the reference images RI from the reference image database DB. The reference images RI may be stored in a computer other than the server 10 or an external information storage medium. In this case, the reference image acquisition module 102 may acquire the reference images RI from the another computer or the external information storage medium. The reference image RI is not required to be prepared in advance, and may be created on the spot by the creation program for the reference image RI described above.

[Estimation Module]

The estimation module 103 estimates the fraud relating to the target foreground TF based on the target background TB shown in the target image TI. This embodiment takes as an example the case in which the estimation module 103 estimates the fraud based on both of the pattern and the color of the target background TB shown in the target image TI, but the estimation module 103 may estimate the fraud based on only one of the pattern and the color of the target background TB shown in the target image TI. The estimation module 103 may estimate the fraud based on an element other than the pattern and the color of the target background TB shown in the target image TI. Examples of the another element are described later.

In this embodiment, the estimation module 103 estimates the fraud based on the target background TB shown in the target image TI and the reference backgrounds shown in the reference images RI. In the example of FIG. 3, the reference background is shown in the entire reference image RI, but the reference background may be shown only in a part of the reference image RI. For example, the estimation module 103 may estimate the fraud by determining whether or not the target background TB shown in the target image TI and the reference background shown in the reference image RI are the same as or similar to each other.

Being similar means a state in which a degree of the similarity between the images is equal to or higher than the threshold value. In other words, a state in which a difference in pixel value is less than a threshold value means being similar. As the method itself for determining the similarity of the images, publicly-known various methods can be used. For example, the similarity may be determined through use of an algorithm for similar image search employed in a search engine, a template matching method of comparing with a template image, a method which uses a machine learning model such as a neural network or vision transformer, or a method employed in a programming language such as Python.

This embodiment takes as an example a case in which the estimation module 103 calculates a score relating to the degree of fraud, to thereby estimate the fraud. Further, as an example of this score, the first score, the second score, and the final score are described. When the first score, the second score, and the final score are not distinguished from one another, the first score, the second score, and the final score are simply referred to as "scores." In this embodiment, it is assumed that the score is not binary, and has intermediate values. That is, the score can express the degree of fraud not at two levels, but at three or more levels. In this embodiment, the fraud is estimated based on the similarity to the reference image RI, and hence the degree of fraud can be considered as a degree of similarity to the reference image RI.

This embodiment takes as an example a case in which the score is expressed in a numerical value, but the score may be expressed in another index such as a character or another symbol. Moreover, a case in which a higher numerical value of the score means a higher degree of fraud is exemplified, but a lower numerical value of the score may mean a higher degree of fraud. It is only required that a certain correlation exist between the numerical value of the score and the degree of fraud. The same applies to the case in which the score is expressed in an index other than the numerical value. For example, when the score is expressed in the alphabet, it is only required that a correlation that the degree of fraud is higher as the position in the order in alphabet becomes later exist.

For example, the estimation module 103 acquires the first score relating to the fraud based on the target background TB shown in the target image TI and a first evaluation method. In this embodiment, the first evaluation method is a method based on the pattern of the target background TB. For example, the first evaluation method is a method which uses the Gabor filter. The Gabor filter is a type of a linear filer used for texture analysis and the like. The Gabor filter extracts a specific frequency component in each predetermined direction in a local region in an image.

For example, the estimation module 103 acquires the first score based on a difference between a frequency component of the target background TB and a frequency component of the reference image RI. This embodiment takes as an example a case in which the estimation module 103 masks the portion of the target foreground TF of the target image TI, and then calculates the frequency component, but the estimation module 103 may calculate the frequency component without masking this portion. A smaller difference between the frequency components means a higher degree of similarity. In this embodiment, a higher first score means a higher degree of similarity, and hence the estimation module 103 calculates the first score such that the first score is higher as the difference between the frequency components is smaller.

The first evaluation method may be a method other than the Gabor filter. For example, the first evaluation method may be a method which uses a local binary pattern, an iris filter, or a linear filter or nonlinear filter which is not classified thereinto. Moreover, the first evaluation method may be a method other than the method of evaluating the pattern. For example, the first evaluation method may be a method of evaluating a degree of a deviation of an arrangement of feature points from a reference. The feature point is a point indicating a feature portion in the target image TI. As the method itself of extracting the feature point, publicly-known various methods can be used, and, for example, SIFT, KAZE, or AKAZE may be used.

For example, the estimation module 103 acquires the second score relating to the fraud based on the target background TB shown in the target image TI and a second evaluation method different from the first evaluation method. In this embodiment, the second evaluation method is a method based on the color of the target background TB. For example, the second evaluation method is a method which uses the color histogram. The color histogram is a distribution indicating an appearance frequency of each color. As the number of pixels in a certain color is larger, the appearance frequency of this color becomes higher. As a generation method itself for the color histogram, publicly-known various methods employed in a programing language such as Python can be used.

For example, the estimation module 103 acquires the second score based on a difference between a color histogram of the target background TB and a color histogram of the reference image RI. This embodiment takes as an example a case in which the estimation module 103 masks the portion of the target foreground TF of the target image TI and then creates the color histogram, but the estimation module 103 may create the color histogram without masking this portion. A smaller difference between the color histograms means a higher degree of similarity. In this embodiment, a higher second score means a higher degree of similarity, and hence the estimation module 103 calculates the second score such that the second score is higher as the difference between the color histograms is smaller.

The second evaluation method may be a method other than the color histogram. For example, the second evaluation method may be a method which uses a machine learning model capable of estimating the similarity in color. Moreover, the second evaluation method may be a method other than the method of evaluating the color. For example, when the first evaluation method is the method which uses the Gabor filter, the second evaluation method may be a method which uses the local binary pattern. For example, when the first evaluation method is the method which uses the color histogram, the second evaluation method may be the method which uses the Gabor filter. The first evaluation method and the second evaluation method may be any other combination.

For example, the estimation module 103 estimates the fraud based on the first score and the second score. This embodiment takes as an example the case in which the estimation module 103 calculates the final score based on the first score and the second score, but the estimation module 103 may estimate the fraud without calculating the final score. For example, the estimation module 103 may estimate that the fraud has occurred when at least one of the first score or the second score is equal to or higher than a threshold value. Moreover, for example, the estimation module 103 may estimate that the fraud has occurred when the number of target regions TR having at least one of the first score or the second score equal to or higher than a threshold value is equal to or larger than a threshold value.

For example, the estimation module 103 estimates the fraud based on the final score. In this embodiment, a higher final score means a higher degree of the fraud, and hence the estimation module 103 estimates that the fraud has been conducted when the final score is equal to or higher than a threshold value. The estimation module 103 estimates that the fraud has not been conducted when the final score is lower than the threshold value. The estimation module 103 records an estimation result of the fraud in the data storage unit 100 or transmits the estimation result to a terminal of the administrator. The estimation module 103 may record the value of the final score in the data storage unit 100 directly as the estimation result of the fraud or may transmit this value to the terminal of the administrator directly as the estimation result of the fraud.

In this embodiment, the estimation module 103 acquires the plurality of target regions TR in which the target background TB is shown from the target image TI. The estimation module 103 estimates the fraud based on the target background TB shown in each of the plurality of target regions TR. For example, the estimation module 103 calculates the first score and the second score for each target region TR. The estimation module 103 calculates the final score based the first average of the first scores of the plurality of target regions TR and the second average of the second scores of the plurality of target regions TR, to thereby estimate the fraud.

This embodiment takes as an example the case in which the estimation module 103 identifies at least one portion determined in advance in the target image TI as at least one target region TR, but the estimation module 103 may identify the at least one target region TR by executing background separation processing on the target image TI. As the background separation processing itself, publicly-known processing can be used. For example, the background separation processing may be background separation processing of identifying a portion other than the contour of the target foreground TF detected by the contour detection processing as the target region TR.

The estimation module 103 may estimate the fraud by acquiring not the score having the intermediate values, but acquiring a binary label indicating whether or not the fraud has been conducted. Moreover, this embodiment takes as an example a case in which the estimation module 103 estimates the fraud not based on the target foreground TF shown in the target image TI, but on the target background TB shown in the target image TI, but the estimation module 103 may estimate the fraud based on both of the target foreground TF and the target background TB shown in the target image TI.

Moreover, the estimation module 103 may estimate the fraud by calculating only one of the first score and the second score without calculating both of the first score and the second score. Moreover, the estimation module 103 is only required to estimate the fraud based on the target background TB shown in the target image TI, and the method of estimating the fraud by the estimation module 103 is not limited to the above-mentioned example. The estimation module 103 may estimate the fraud based on the another element described above. The another element may be the number of feature points, an arrangement of the feature points, a brightness in the target image TI, or an embedded expression in the machine learning.

For example, the estimation module 103 may estimate the fraud not based on the reference images RI, but by determining whether or not the pattern of the target background TB shown in the target image TI is a predetermined pattern or similar to the predetermined pattern. The state in which the patterns are similar to each other means a state in which the degree of similarity between the patterns is equal to or higher than a predetermined degree. As a method itself of determining the similarity between the patterns, publicly-known various methods can be used. For example, the method may be a method which uses the Gabor filter or the local binary pattern.

For example, the estimation module 103 may estimate the fraud not based on the reference images RI, but by determining whether or not the color of the target background TB shown in the target image TI is a predetermined color or similar to the predetermined color. The state in which the colors are similar to each other means a state in which the degree of similarity between the colors is equal to or higher than a predetermined degree. As a method itself of determining the similarity between the colors, publicly-known methods can be used. For example, the method may be a method which uses the color histogram.

For example, the estimation module 103 may estimate the fraud by inputting the target image TI into a machine learning model which has learned various fraudulent backgrounds. In this case, the machine learning model has learned the reference images RI as training data. The machine learning model has learned the training data including pairs each of which is a combination of the reference image RI and a label indicating the fraud. When the estimation module 103 inputs the target image TI into the machine learning model, the machine learning model calculates a feature amount of the target image TI and outputs a label corresponding to the feature amount. The estimation module 103 may estimate the fraud by acquiring the label output from the machine learning model.

[3-2. Functions Implemented in User Terminal]

For example, the user terminal 20 includes a data storage unit 200 and a transmission module 201. The data storage unit 200 is implemented by the storage unit 22. The transmission module 201 is implemented by the control unit 21.

[Data Storage Unit]

The data storage unit 200 stores data required to acquire the target image TI. In this embodiment, the data storage unit 200 stores the target image TI generated by the photographing unit 26. The data storage unit 200 may store the target image TI generated by a camera other than the photographing unit 26 or the like.

[Transmission Module]

The transmission module 201 transmits the target image TI to the server 10. In this embodiment, the transmission module 201 transmits the target image TI generated by the photographing unit 26 to the server 10. The transmission module 201 may transmit the target image TI stored in the data storage unit 200 to the server 10.

[4. Processing Executed by Image Processing System]

Figure 5:
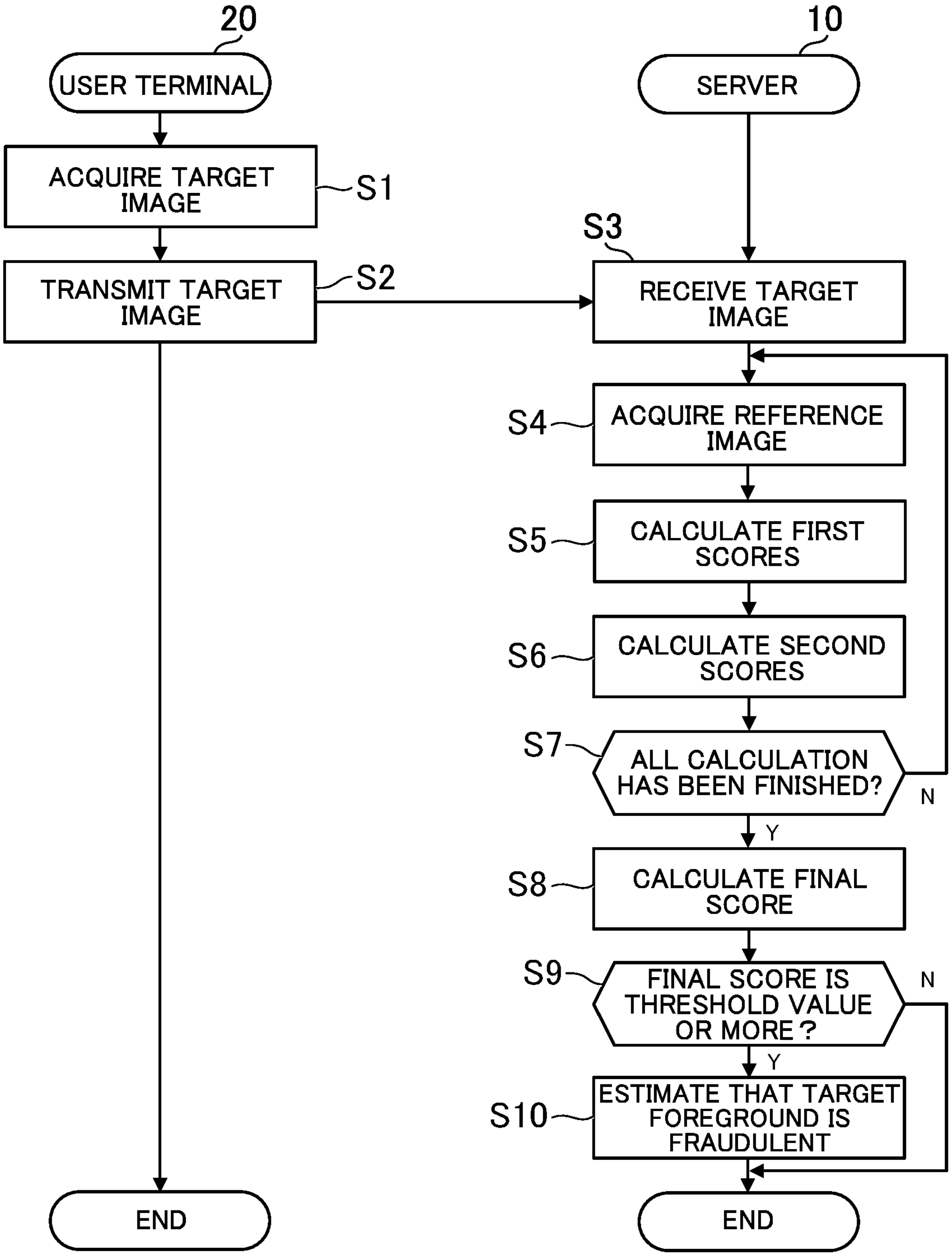
FIG. 5 is a flowchart for illustrating an example of processing executed by the image processing system.

FIG. 5 is a flowchart for illustrating an example of processing executed by the image processing system 1. As illustrated in FIG. 5, when the user captures the driver's license by the photographing unit 26, the user terminal 20 acquires the target image TI generated by the photographing unit 26 (Step S1). The user terminal 20 transmits the target image TI to the server 10 (Step S2). When the server 10 receives the target image TI (Step S3), the server 10 acquires the reference image RI from the reference image database DB (Step S4).

The server 10 calculates the first scores based on the target image TI and the reference image RI (Step S5). The server 10 calculates the second scores based on the target image TI and the reference image RI (Step S6). The server 10 determines whether or not the first scores and the second scores have been calculated by using all of the reference images RI (Step S7). When it is determined that a reference image RI for which the first scores and the second scores have not been calculated exists (N in Step S7), the process returns to Step S4, and the first scores and the second scores are calculated for a next reference image RI.

When it is determined that the first scores and the second scores are calculated by using all of the reference images RI (Y in Step S7), the server 10 calculates the final score based on the first scores and the second scores of all of the reference images RI (Step S8). The server 10 determines whether or not the final score is equal to or higher than the threshold value (Step S9). When it is determined that the final score is equal to or higher than the threshold value (Y in Step S9), the server 10 estimates that the target foreground TF is fraudulent, and executes processing for preferentially performing the manual check (Step S10). In Step S10, the server 10 stores the target image TI received in Step S3 in a database for storing target images TI being the target of the manual check. When it is determined that the final score is lower than the threshold value (N in Step S9), the server 10 estimates that the target foreground TF is not fraudulent, and does not execute the processing step of Step S10.

The image processing system 1 according to this embodiment estimates the fraud relating to the target foreground TF based on the target background TB shown in the target image TI. The estimation accuracy for the fraud increases by focusing on not the target foreground TF being the estimation target for the fraud, but the target background TB being background thereof. For example, even in a case in which a malicious user captures a target foreground TF elaborately falsified and uploads a target image TI thereof, when a certain tendency exists in a target background TB, the tendency may be used as a clue for discovering the fraud of the target foreground TF. Various technologies seem to exist as the technology of estimating the fraud by focusing on the target foreground TF being the foreground of the target image TI. However, the estimation accuracy for the fraud increases by intentionally focusing on the target background TB, which seems not to exist as the related art. For example, when the fraud is estimated based on both of the target foreground TF and the target background TB, the estimation accuracy for the fraud increases more. The fraud may be estimated through use of only the method described in this embodiment, but the fraud may be estimated in comprehensive consideration of other elements such as the target foreground TF and a location of the user terminal 20. In this case, the method described in this embodiment serves as one of pieces of information for decision when the fraud is finally estimated.

Moreover, the image processing system 1 estimates the fraud based on the target background TB shown in the target image TI and the reference backgrounds shown in the reference images RI. As a result, the reference images RI serving as the reference are used to estimate the fraud, and hence the estimation accuracy for the fraud increases more. For example, when a malicious user uses a reference image RI showing a fraudulent background existing on the rear of a fraudulent foreground actually falsified to try to conduct the fraud again, a similar fraudulent background may be created. In this case, the fraud can accurately be estimated. The fraud can be estimated by the administrator of the image processing system 1 preparing the reference images RI, and hence the reference used to estimate the fraud can easily be specified by the administrator.

Moreover, the reference image RI in this embodiment is the portion of the fraudulent background of the fraudulent image. As a result, it is possible to use the fraudulent image in which fraud has actually conducted to estimate the fraud, and hence the estimation accuracy for the fraud increases more.

Moreover, the image processing system 1 estimates the fraud based on the first score and the second score. As a result, the fraud is multilaterally estimated through use of the plurality of estimation methods, and hence the estimation accuracy for the fraud increases more.

Moreover, the first evaluation method in this embodiment is the method based on the pattern of the target background TB. The second evaluation method in this embodiment is the method based on the color of the target background TB. As a result, the fraud is estimated through use of both of the pattern and the color of the target background TB, and hence the estimation accuracy for the fraud increases more.

Moreover, the image processing system 1 estimates the fraud based on the final score based on the first score and the second score. As a result, the fraud can be estimated based on the one index such as the final score, and hence the fraud can be estimated based on the index which can easily be evaluated. For example, when the final score is to be presented to the administrator of the image processing system 1, the administrator is only required to see the one index such as the final score, and hence can easily determine whether or not the fraud has been conducted.

Moreover, the image processing system 1 estimates the fraud based on the target background TB shown in each of the plurality of target regions TR acquired from within the target image TI. As a result, the fraud can be estimated in comprehensive consideration of the plurality of portions in the target image TI, and hence the estimation accuracy for the fraud increases more. For example, when a tendency of the fraud does not appear in a certain portion of the target image TI, but the tendency of the fraud appears in another portion thereof, the fraud can be estimated from the tendency in the another portion.

Moreover, the target background TB in this embodiment is the another object on which the subject to be captured by the photographing unit 26 is placed. As a result, when a malicious user tends to capture the driver's license placed on a specific object, the estimation accuracy for the fraud increases.

Further, the target foreground TF in this embodiment is the identity verification document. The fraud is falsification of the identity verification document. As a result, the accuracy for estimating the fraud of the identity verification document increases.

5. Modification Examples

The present disclosure is not limited to the embodiment described above, and can be modified suitably without departing from the spirit of the present disclosure.

Figure 6:
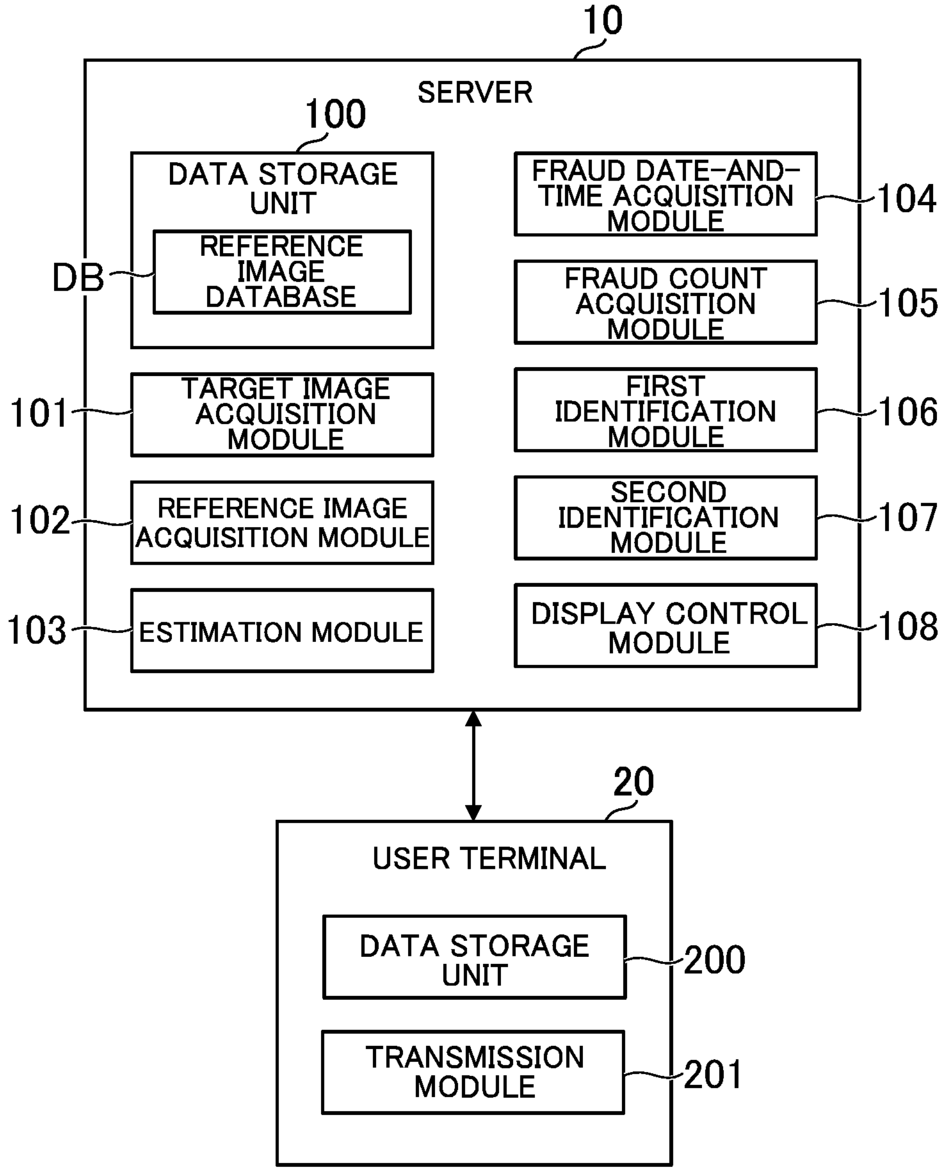
FIG. 6 is a diagram for illustrating an example of functions implemented in modification examples of the present disclosure.

FIG. 6 is a diagram for illustrating an example of functions implemented in modification examples. For example, the server 10 includes a fraud date-and-time acquisition module 104, a fraud count acquisition module 105, a first identification module 106, a second identification module 107, and a display control module 108. Each of the fraud date-and-time acquisition module 104, the fraud count acquisition module 105, the first identification module 106, the second identification module 107, and the display control module 108 is implemented by the control unit 11.

FIG. 7 is a table for showing an example of the reference image database DB in the modification examples. For example, in the reference image database DB, actual data on the reference images RI, fraud dates and times, numbers of times of fraud, types of the reference backgrounds, and types of reference foregrounds are stored. Other information may be stored in the reference image database DB, and the information stored in the reference image database DB is not limited to the example of FIG. 7. For example, information on a fraudulent image from which the reference image RI was created may be stored in the reference image database DB. In this case, of a plurality of reference images RI created from one certain fraudulent image, only a predetermined number of reference images RI may be compared with the target image TI.

The actual data on the reference image RI is image data on the reference image RI. The reference image RI may be in any data format such as JPEG or PNG. The fraud date and time are a date and time at which the actual fraud was conducted. For example, the fraud date and time are a date and time of creation, a date and time of update, or a date and time of access included in a property of a fraudulent image being the source of the reference image RI. The fraud date and time may be a date and time at which the fraudulent image was uploaded. The fraud date and time may be a date and time of creation, a date and time of update, or a date and time of access included in a property of the reference image RI. In this case, the fraud date and time may be included in actual data on the reference image RI.

The number of times of the fraud is the number of times the fraud has actually been conducted. For example, the number of times of the fraud is the number of times of the fraud conducted for a background which is the same as or similar to the fraudulent background shown in the reference image RI. In the example of FIG. 7, four fraudulent images each having, as a fraudulent background, a towel which is the same as or similar to a towel shown in the reference image RI of “00001.jpg” exist, and hence the number of times of the fraud is four. The reference background type is information indicating a type of an object shown as the reference background. When the reference image RI is created based on a fraudulent image, the reference background type is the same as the type of the fraudulent background. The reference foreground type is information indicating a type of a foreground shown as the reference foreground corresponding to the reference background. When the reference image RI is created based on a fraudulent image, the reference foreground type is the same as the type of the fraudulent foreground being the foreground shown in the fraudulent image.

5-1. Modification Example 1

For example, the tendency of a malicious user may change in real time. In the reference image database DB, old reference images RI each created based on a fraudulent image on which fraud was conducted a certain time ago and recent reference images RI each created based on a fraudulent image on which fraud was conducted recently may be mixed. In this case, when the recent reference images RI are considered more important than the old reference images RI to estimate the fraud, estimation matching a recent tendency of the fraud can be executed.

Thus, in Modification Example 1, a case in which the fraud is estimated also in consideration of the fraud date and time associated with the reference image RI is described. The image processing system 1 according to Modification Example 1 includes the fraud date-and-time acquisition module 104. The fraud date-and-time acquisition module 104 acquires the fraud date and time associated with the reference image RI. In Modification Example 1, the fraud dates and times are stored in the reference image database DB, and hence the fraud date-and-time acquisition module 104 refers to the reference image database DB to acquire the fraud date and time.

The fraud date and time may be stored in a database other than the reference image database DB, a computer other than the server 10, or an external information storage medium. In this case, the fraud date-and-time acquisition module 104 is only required to acquire the fraud date and time from the another database, the another computer, or the external information storage medium. The fraud date and time is not required to be data independent of the reference image RI, and may be included as a part of the actual data (for example, a part of the property) on the reference image RI.

The estimation module 103 in Modification Example 1 estimates the fraud based on the target background TB shown in the target image TI, the fraudulent backgrounds shown in the reference images RI, and the fraud dates and times. For example, the estimation module 103 calculates at least one of the first scores or the second scores based on not only the target background TB and the fraudulent background, but also the fraud date and time. The estimation module 103 determines weight coefficients such that a weight coefficient of at least one of a calculation expression for the first score or a calculation expression for the second score increases as the elapsed time since the fraud date and time is shorter (as the fraud date and time are more recent), to thereby calculate at least one of the first scores or the second scores.

The estimation module 103 in Modification Example 1 is only required to estimate the fraud in consideration of not only the target background TB and the fraudulent backgrounds, but also the fraud dates and times, and the method of estimating the fraud based on the fraud dates and times is not limited to the above-mentioned example. For example, the estimation module 103 may estimate the fraud by using, of the reference images RI stored in the reference image database DB, only reference images RI each having an elapsed time since the fraud date and time shorter than a threshold value or only reference images RI acquired in such a manner that the number of reference images RI is larger as the elapsed time since the fraud date and time is shorter. In this case, the estimation module 103 may determine the above-mentioned weight coefficients based on the elapsed time since the fraud date and time, or the weight coefficients may be the same values regardless of the elapsed time since the fraud date and time.

For example, when the fraud frequently occurs in a specific period, the estimation module 103 determines the weight coefficients not based on the elapsed time since the fraud date and time, but such that the weight coefficients for the reference images RI having the fraud dates and times included in the specific period are large, to thereby calculate at least one of the first scores or the second scores. In this case, the estimation module 103 may estimate the fraud by using, of the reference images RI stored in the reference image database DB, only reference images RI each having the fraud date and time included in the specific period or only reference images RI acquired in such a manner that the number of reference images RI each having the fraud date and time included in the specific period is larger.

The image processing system 1 according to Modification Example 1 estimates the fraud based on the target background TB shown in the target image TI, the fraudulent backgrounds shown in the reference images RI, and the fraud dates and times. As a result, the fraud can be estimated by using not only the target background TB and the fraudulent backgrounds, but also the fraud dates and times, and hence the estimation accuracy for the fraud increases.

5-2. Modification Example 2

For example, a certain specific user may continuously conduct the fraud in a similar manner. In the reference image database DB, reference images RI showing fraudulent backgrounds relating to frequent occurrence of the fraud and reference images RI not relating to the frequent occurrence of the fraud may be mixed. In this case, when the reference images RI showing the fraudulent backgrounds relating to the frequent occurrence of the fraud are considered more important than the reference images RI not relating to the frequent occurrence of the fraud to estimate the fraud, an estimation accuracy for the frequently-occurring fraud increases.

Thus, in Modification Example 2, a case in which the fraud is estimated also in consideration of the number of times of the fraud associated with the reference image RI is described. The image processing system 1 according to Modification Example 2 includes the fraud count acquisition module 105. The fraud count acquisition module 105 further: includes the fraud count acquisition module 105 which acquires the number of times of the fraud associated with the reference image RI. In Modification Example 2, the number of times of the fraud is stored in the reference image database DB, and hence the fraud count acquisition module 105 refers to the reference image database DB to acquire the number of times of the fraud.

The number of times of the fraud may be stored in a database other than the reference image database DB, a computer other than the server 10, or an external information storage medium. In this case, the fraud count acquisition module 105 is only required to acquire the number of times of the fraud from the another database, the another computer, or the external information storage medium. The number of times of the fraud is not required to be data independent of the reference image RI, and may be included as a part of the actual data (for example, a part of the property) on the reference image RI.

The estimation module 103 in Modification Example 2 estimates the fraud based on the target background TB shown in the target image TI, the fraudulent backgrounds shown in the reference images RI, and the number of times of the fraud. For example, the estimation module 103 calculates at least one of the first scores or the second scores based on not only the target background TB and the fraudulent background, but also the number of times of the fraud. The estimation module 103 determines weight coefficients such that the weight coefficient of at least one of the calculation expression for the first score or the calculation expression for the second score increases as the number of times of the fraud is larger (as the fraud occurs more frequently), to thereby calculate at least one of the first scores or the second scores.

The estimation module 103 in Modification Example 2 is only required to estimate the fraud in consideration of not only the target background TB and the fraudulent backgrounds, but also the number of times of the fraud, and the method of estimating the fraud based on the number of times of the fraud is not limited to the above-mentioned example. For example, the estimation module 103 may estimate the fraud by using, of the reference images RI stored in the reference image database DB, only reference images RI each having the number of times of the fraud equal to or larger than a threshold value or only reference images RI acquired in such a manner that the number of reference images RI is larger as the number of times of the fraud is larger. In this case, the estimation module 103 may determine the above-mentioned weight coefficients based on the number of times of the fraud, or the weight coefficients may be the same values regardless of the number of times of the fraud.

The image processing system 1 according to Modification Example 2 estimates the fraud based further on the target background TB shown in the target image TI, the fraudulent backgrounds shown in the reference images RI, and the number of times of the fraud. As a result, the fraud can be estimated by using not only the target background TB and the fraudulent backgrounds, but also the number of times of the fraud, and hence the estimation accuracy for the fraud increases.

5-3. Modification Example 3

Reference images RI showing various fraudulent backgrounds may be mixed in the reference image database DB. In this case, in the reference image database DB, a large number of reference images RI are stored, and hence the reference images RI serving as the target of the comparison increase. Consequently, a processing load on the server 10 possibly becomes higher.

Thus, in Modification Example 3, a case in which a reference image RI of the same type as that of the target background TB is set as the comparison target is described. The image processing system 1 includes the first identification module 106. The first identification module 106 identifies a target background type being a type of the target background TB based on the target image TI. For example, the first identification module 106 identifies the target background type based on a machine learning model. The machine learning model has learned training data including pairs each of which is a combination of a training image showing a training background being a background for the training and the type of the training background.

As the machine learning method itself, various methods available in the image processing can be used. For example, the machine learning model may be created through use of a neural network, an adversarial network, or a vision transformer. As the learning of the training data, a learning method corresponding to a machine learning method used in the machine learning model can be used. For example, the training of the machine learning model may be executed through use of a learning method such as an error back-propagation method or a gradient descent method.

In Modification Example 3, a machine learning model which uses the neural network is exemplified. For example, the first identification module 106 inputs the target image TI into the machine learning model. The machine learning model executes convolution of the target image TI to calculate a feature amount, and outputs the target background type corresponding to the feature amount. The first identification module 106 acquires the target background type output from the machine learning model, to thereby identify the target background type.

As the identification method for the target background type, it is only required to use a method for classifying an image, and the identification method is not limited to the method which uses the machine learning model. For example, the first identification module 106 may identify the target background type through use of a pattern matching method. The data storage unit 100 stores template images of various backgrounds. The first identification module 106 identifies the target background type based on the target image TI and the template images. For example, the first identification module 106 identifies a type of a background shown in a template having the highest similarity calculated through use of the pattern matching method as the target background type. It is assumed that the type of the background is associated with the template image.

The reference image acquisition module 102 in Modification Example 3 acquires, from the reference image database DB in which the reference background type being the type of the reference background and the reference image RI are associated with each other, the reference image RI having the same reference background type as the target background type. For example, when a target background type "towel" is identified by the first identification module 106, the reference image acquisition module 102 acquires a reference image RI having a reference background type "towel." When a target background type "flooring" is identified by the first identification module 106, the reference image acquisition module 102 acquires a reference image RI having a reference background type "flooring." Processing of the estimation module 103 to be executed after the acquisition of the reference image RI is the same as that in the embodiment or that in Modification Examples 1 to 3.

The image processing system 1 according to Modification Example 3 acquires a reference image RI having the same reference background type as the target background type from the reference image database DB. As a result, the number of reference images RI used to estimate the fraud decreases, and hence the processing load on the server 10 can be reduced. A speed of the processing for estimating the fraud can be increased. Reference images RI useful for estimating the fraud can be used, and hence the estimation accuracy for the fraud can be guaranteed.

5-4. Modification Example 4

For example, the case in which the reference images RI are narrowed down based on the target background type is exemplified in Modification Example 3, but the reference images RI may be narrowed down based on a target foreground type being a type of the target foreground TF. The image processing system 1 according to Modification Example 4 includes the second identification module 107. The second identification module 107 identifies the target foreground type. For example, the second identification module 107 identifies the target foreground type by acquiring a target foreground type specified by the user who uploads the target image TI. In Modification Example 4, a case in which the user specifies one target foreground document is described, but the user may specify a plurality of target foreground types.

Figure 8:
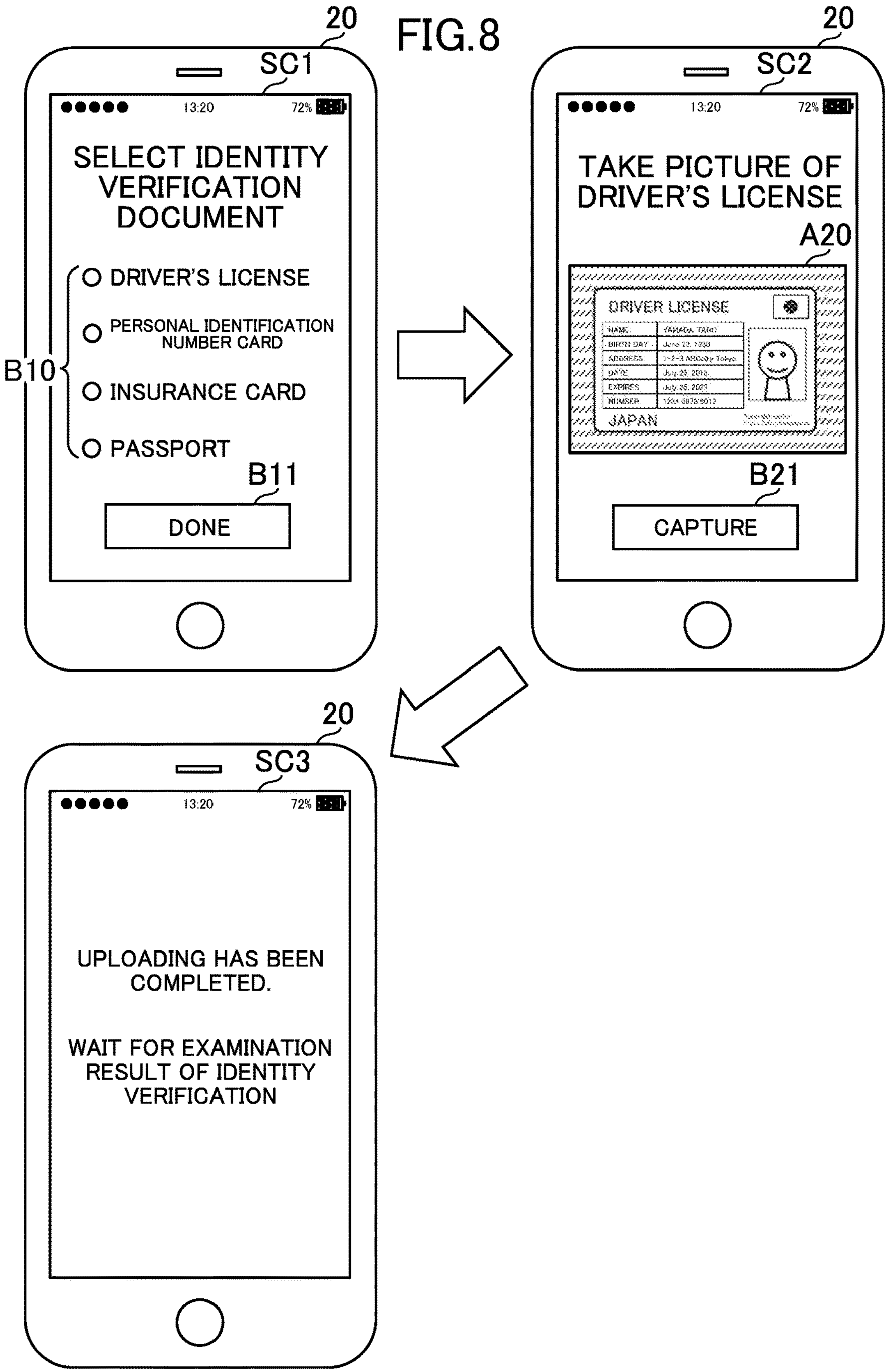
FIG. 8 is a view for illustrating an example of screens displayed on a user terminal in Modification Example 4.

FIG. 8 is a view for illustrating an example of screens displayed on the user terminal 20 in Modification Example 4. For example, on the user terminal 20, a specification screen SC1 for the user to specify the target foreground type is displayed. In the example of FIG. 8, the identity verification document can be specified from four types including the driver's license, the personal identification number card, the insurance card, and the passport. The identity verification document which can be specified by the user may be of any type, and is not limited to the four types. For example, the user may be allowed to select the identity verification document from two types, three types, or five or more types of identity verification documents.

For example, the user uses a button B10 of the specification screen SC1 to specify the target foreground type. When the user selects a button B11, a photographing screen SC2 for capturing the target foreground TF is displayed on the user terminal 20. In a display area A20 of the photographing screen SC2, a captured image continuously generated by the photographing unit 26 is displayed. When the user selects a button B21, the photographing unit 26 captures the identity verification document, to thereby generate the target image TI. After that, the target image TI is uploaded to the server 10, and a completion screen SC3 indicating completion of the upload is displayed on the user terminal 20.

For example, the user terminal 20 transmits type identification information indicating the target foreground type specified by the user through use of the button B10 to the server 10 together with the target image TI. In the example of FIG. 8, the type identification information indicates the specified type of the four types of identity verification documents. The server 10 receives the target image TI and the type identification information. The second identification module 107 identifies the target foreground type by referring to the type identification information.

The identification method for the target foreground type is not limited to the method of referring to the target foreground type specified by the user. For example, the second identification module 107 may identify the target foreground type by executing image processing on the target image TI. This image processing may be publicly-known processing used for object recognition. The second identification module 107 may identify the target foreground type based on a machine learning model which has learned various shapes of the foreground. The second identification module 107 may identify the target foreground type through use of pattern matching based on template images of the various foregrounds. Moreover, for example, the administrator of the image processing system 1 may visually confirm the target foreground type. In this case, the second identification module 107 identifies the target foreground type by acquiring a visual confirmation result from the terminal of the administrator.

The reference image acquisition module 102 in Modification Example 4 acquires, from the reference image database DB in which the reference foreground type being the type of the reference foreground corresponding to the reference background and the reference image RI are associated with each other, the reference image RI having the same reference foreground type as the target foreground type. For example, when a target foreground type "driver's license" is identified by the second identification module 107, the reference image acquisition module 102 acquires a reference image RI having a reference foreground type "driver's license." When a target foreground type "insurance card" is identified by the second identification module 107, the reference image acquisition module 102 acquires a reference image RI having a reference foreground type "insurance card." Processing of the estimation module 103 to be executed after the acquisition of the reference image RI is the same as that in the embodiment or that in Modification Examples 1 to 4.

The image processing system 1 according to Modification Example 4 acquires a reference image RI having the same reference foreground type as the target foreground type from the reference image database DB. As a result, the number of reference images RI used to estimate the fraud decreases, and hence the processing load on the server 10 can be reduced. A speed of the processing for estimating the fraud can be increased. Reference images RI useful for estimating the fraud can be used, and hence the estimation accuracy for the fraud can be guaranteed.

5-5. Modification Example 5

For example, when the target foreground TF in the target image TI is distorted or curved, a portion of the target background TB may not appropriately be identified. Thus, the estimation module 103 may shape the target image TI such that the target foreground TF in the target image TI takes a predetermined shape, to thereby estimate the fraud based on the target background TB shown in the shaped target image TI. The processing itself of estimating the fraud is different from that in the embodiment in such a point that the shaped target image TI is used, but is the same as that in the embodiment in other points.

Figure 9:
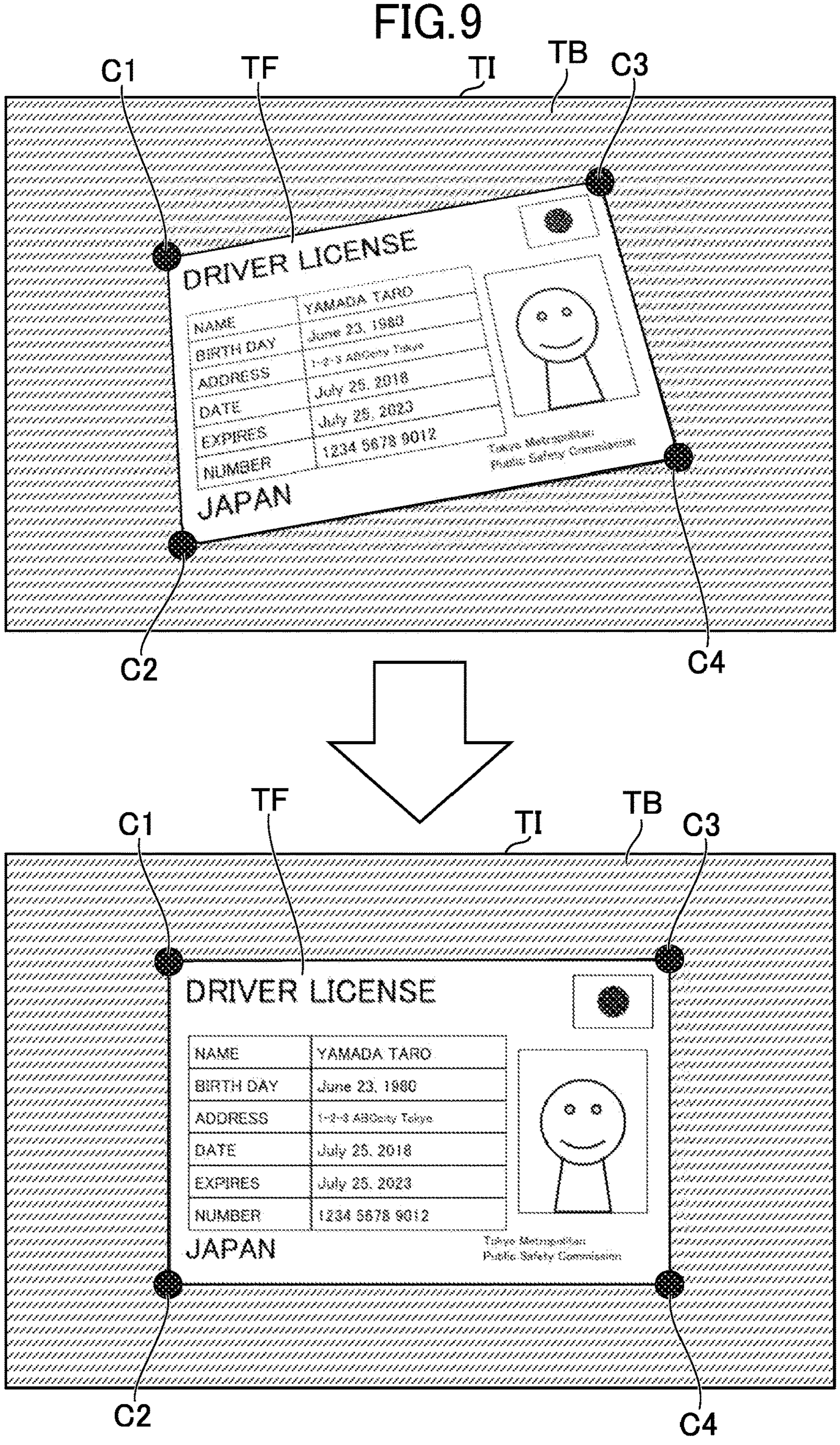
FIG. 9 is a view for illustrating an example of processing of shaping a target image.

FIG. 9 is a view for illustrating an example of the processing of shaping the target image TI. For example, the estimation module 103 executes contour extraction processing (edge detection processing) on the target image TI, to thereby extract a contour of the target foreground TF. The estimation module 103 extracts four corners C1 to C4 of the target foreground TF from the contour of the target foreground TF. The estimation module 103 shapes the target image TI such that a positional relationship among the four corners C1 to C4 achieves a predetermined positional relationship. As the shaping itself for the target image TI, it is only required to use publicly-known image processing, and, for example, an affine transformation, a projection transformation, or a similarity transformation can be used.

The method of shaping the target image TI is not limited to the example of FIG. 9. For example, the estimation module 103 may shape the target image TI by using not the four corners C1 to C4, but any two or three of the corners C1 to C4. The estimation module 103 may use feature points other than the corners C1 to C4 to shape the target image TI. For example, the estimation module 103 may shape the target image TI based on at least one of feature points on the contour other than the corners C1 to C4 of the target foreground TF or feature points inside the target foreground TF. In this case, the estimation module 103 shapes the target image TI so that a positional relationship among the plurality of feature points achieves a predetermined positional relationship.

The image processing system 1 according to Modification Example 5 estimates the fraud based on the target background TB shown in the target image TI shaped such that the target foreground TF in the target image TI takes the predetermined shape. As a result, the portion showing the target background TB can more easily be identified, and hence the estimation accuracy for the fraud increases. Further, the target image TI is shaped such that the target foreground TF takes the predetermined shape and hence the target background TB is also shaped consequently, with the result that the fraud can be estimated after the target background TB is shaped into the state in which the fraud is easily estimated.

5-6. Modification Example 6

For example, some users may capture the target foreground TF such that the target foreground TF is shown over the entire target image TI. In this case, the target background TB is hardly shown in the target image TI, and hence the method described in the embodiment cannot be applied. Thus, the user terminal 20 may display a guide for guiding the user to capture the target background TB to a certain extent.

Figure 10:
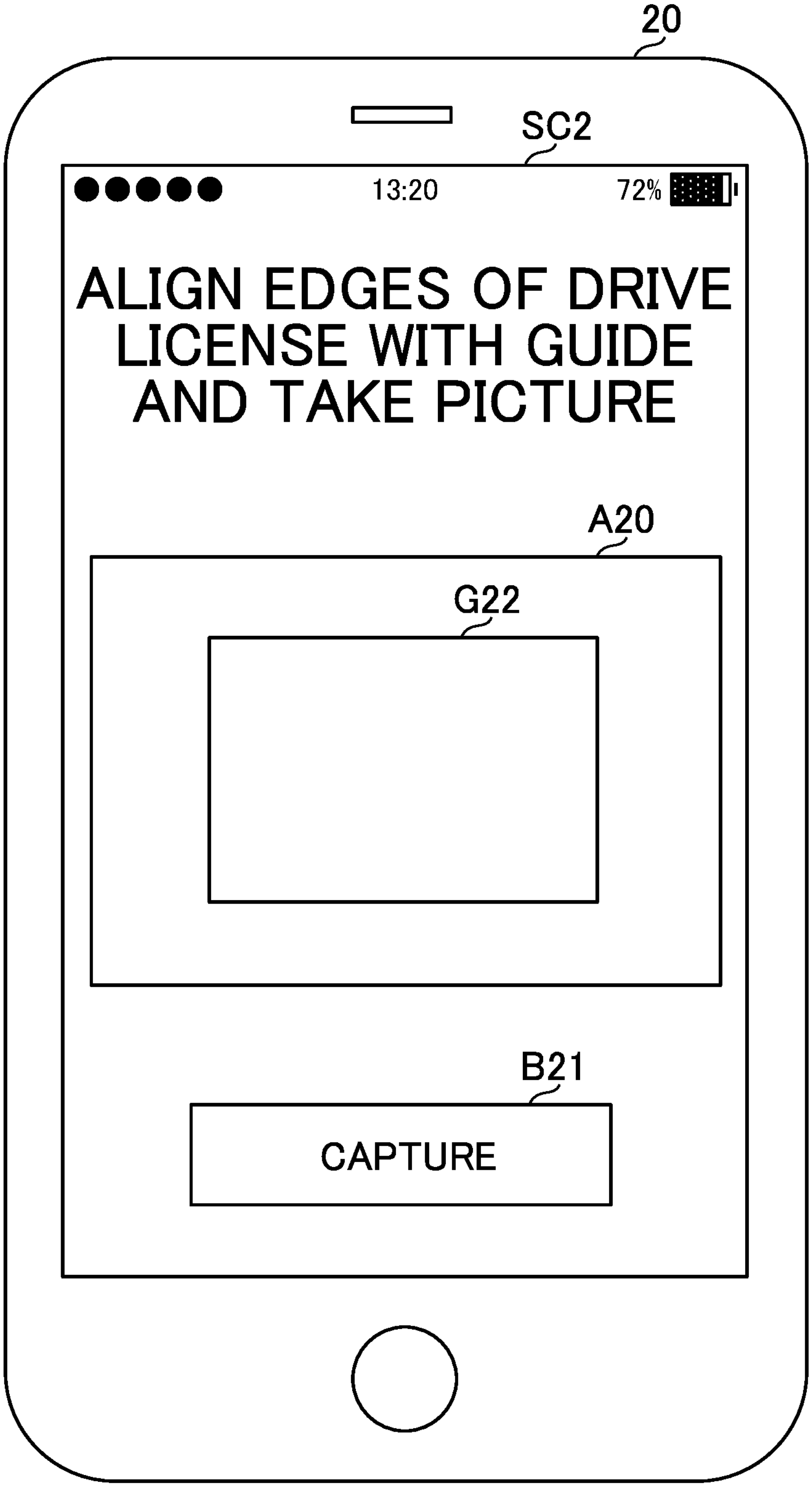
FIG. 10 is a view for illustrating an example of a photographing screen in Modification Example 6.

FIG. 10 is a view for illustrating an example of the photographing screen in Modification Example 6. The image processing system 1 according to Modification Example 6 includes the display control module 108. The display control module 108 causes the user terminal 20 to display a guide G22 for causing the target background TB to be shown in the target image TI to a certain extent. In Modification Example 6, the display control module 108 is implemented by the server 10, and hence the display control module 108 generates display data on the photographing screen SC2 including the guide G22 and transmits the display data to the user terminal 20, to thereby cause the user terminal 20 to display the guide G22.

The display data is only required to be data for causing the user terminal 20 to display a certain screen, and may be in any data format. For example, when a browser is used, the display data may be in the HTML format. When an application other than the browser is used, the display data may be in a format (for example, an image data format such as JPEG or PNG) which can be handled by the application.

In the example of FIG. 10, the guide G22 is smaller than the display area A20. A certain distance is provided between each end of the display area A20 and each end of the guide G22, and hence the target background TB is displayed between those ends. For example, a vertical width and a horizontal width of the display area A20 match a vertical width and a horizontal width of the target image TI, respectively. The guide G22 is set such that the target regions TR1 to RT10 are contained in a portion of the display area A20 other than the guide G22. It is assumed that information indicating the vertical width and the horizontal width of the guide G22 are stored in the data storage unit 100.

The target image acquisition module 101 in Modification Example 6 acquires the target image TI captured by the user terminal 20 under a state in which the guide G22 is displayed. Modification Example 6 is different from the embodiment in that the guide G22 is displayed at the time of the photographing by the user, but the acquisition method itself for the target image TI and the estimation method itself for the fraud are the same as those in the embodiment. The guide G22 is not required to be displayed through the control on the server 10 side, and, in this case, it is assumed that the display control module 108 is included in the user terminal 20. The display control module 108 of the user terminal 20 is only required to display the guide G22 based on an application stored in the data storage unit 200.

The image processing system 1 according to Modification Example 6 acquires the target image TI captured by the user terminal 20 under the state in which the guide is displayed. As a result, the target background TB required to estimate the fraud can sufficiently be included in the target image TI, and hence the estimation accuracy for the fraud increases.

5-7. Other Modification Examples

For example, Modification Examples 1 to 6 described above may be combined with one other.

For example, the case in which the fraud of the document such as the identity verification document is estimated is exemplified, but it is only required that the target foreground be an object being the estimation target for a certain type of fraud, and is not limited to the document. For example, when the image processing system 1 is applied to a scene in which fraud of a product put on sale on an online shopping mall or a flea market service is to be estimated, the target foreground may be the product. Also in this case, a certain feature may exist in the background when a malicious third party captures and puts a counterfeit product being a fraudulent product on sale. The image processing system 1 estimates whether or not the product is fraudulent based on the target background TB shown in the target image TI. In this case, it is only required that processing in which the identity verification document described in the embodiment is replaced by the product be executed.

For example, the case in which main processing is executed on the server 10 is described in the embodiment, but the processing described as processing to be executed on the server 10 may be executed on the user terminal 20. For example, the estimation by the estimation module 103 may be executed by an application stored in the user terminal 20. In this case, it is only required that the reference image acquisition module 102 of the user terminal 20 acquire the reference image RI from the server 10. The processing by each of the target image acquisition module 101, the reference image acquisition module 102, and the estimation module 103 may be distributed to the server 10 and the user terminal 20. When the processing is distributed, the data required for the image processing may appropriately be transmitted between the server 10 and the user terminal 20.

[6. Supplementary Notes]

The image processing system may be configured as described below.

(1)

An image processing system, including:

a target image acquisition module configured to acquire a target image showing a target foreground that is a foreground being an estimation target for fraud and a target background being a background of the target foreground; and an estimation module configured to estimate fraud relating to the target foreground based on the target background shown in the target image.

(2)

The image processing system according to Item (1), further including a reference image acquisition module configured to acquire a reference image showing a reference background being a background for reference, wherein the estimation module is configured to estimate the fraud based on the target background shown in the target image and the reference background shown in the reference image.

(3)

The image processing system according to Item (2), wherein the reference image is a portion of a fraudulent background of a fraudulent image showing a fraudulent foreground being a foreground that is fraudulent and the fraudulent background being a background of the fraudulent foreground, and wherein the reference background is the fraudulent background.

(4)

The image processing system according to Item (3), further including a fraud date-and-time acquisition module configured to acquire a fraud date and time associated with the reference image, wherein the estimation module is configured to estimate the fraud based on the target background shown in the target image, the fraudulent background shown in the reference image, and the fraud date and time.

(5)

The image processing system according to Item (3) or (4), further including a fraud count acquisition module configured to acquire the number of times of fraud associated with the reference image, wherein the estimation module is configured to estimate the fraud based further on the target background shown in the target image, the fraudulent background shown in the reference image, and the number of times of fraud.

(6)

The image processing system according to any one of Items (2) to (5), further including a first identification module configured to identify a target background type being a type of the target background, wherein the reference image acquisition module is configured to acquire, from a reference image database in which a reference background type being a type of the reference background and the reference image are associated with each other, the reference image having the same reference background type as the target background type.

(7)

The image processing system according to any one of Items (2) to (6), further including a second identification module configured to identify a target foreground type being a type of the target foreground, wherein the reference image acquisition module is configured to acquire, from a reference image database in which a reference foreground type being a type of the reference foreground that is a foreground corresponding to the reference background and the reference image are associated with each other, the reference image having the same reference foreground type as the target foreground type.

(8)

The image processing system according to any one of Items (1) to (7), wherein the estimation module is configured to:

acquire a first score relating to the fraud based on the target background shown in the target image and a first evaluation method;

acquire a second score relating to the fraud based on the target background shown in the target image and a second evaluation method different from the first evaluation method; and estimate the fraud based on the first score and the second score.

(9)

The image processing system according to Item (8), wherein the first evaluation method is a method based on a pattern of the target background, and wherein the second evaluation method is a method based on a color of the target background.

(10)

The image processing system according to Item (8) or (9), wherein the estimation module is configured to:

calculate a final score based on the first score and the second score; and estimate the fraud based on the final score.

(11)

The image processing system according to any one of Items (1) to (10), wherein the estimation module is configured to:

acquire a plurality of target regions in which the target background is shown from the target image; and estimate the fraud based on the target background shown in each of the plurality of target regions.

(12)

The image processing system according to any one of Items (1) to (11), wherein the estimation module is configured to:

shape the target image such that the target foreground in the target image takes a predetermined shape; and estimate the fraud based on the target background shown in the shaped target image.

(13)

The image processing system according to any one of Items (1) to (12), further including a display control module configured to cause a user terminal to display a guide for causing the target background to be shown in the target image to a certain extent, wherein the target image acquisition module is configured to acquire the target image captured by the user terminal under a state in which the guide is displayed.

(14)

The image processing system according to any one of Items (1) to (13), wherein the target foreground is a subject captured by a photographing unit, and wherein the target background is another object on which the subject is placed.

(15)

The image processing system according to any one of Items (1) to (14), wherein the target foreground is an identity verification document, and wherein the fraud is falsification of the identity verification document.

The invention claimed is:

1. An image processing system, comprising at least one processor configured to:

acquire a target image showing a target foreground that is a foreground being an estimation target for fraud and a target background being a background of the target foreground;

acquire a reference image showing a reference background being a background for reference, estimate fraud relating to the target foreground based on the target background shown in the target image and the reference background shown in the reference image;

wherein the reference image is a portion of a fraudulent background of a fraudulent image showing a fraudulent foreground being a foreground that is fraudulent and the fraudulent background being a background of the fraudulent foreground, wherein the reference background is the fraudulent background; and wherein the at least one processor is configured to estimate fraud using a Gabor filter to calculate a pattern similarity between the target image and the reference background.

2. The image processing system according to claim 1, wherein the at least one processor is configured to acquire a fraud date and time associated with the reference image, and wherein the at least one processor is configured to estimate the fraud based on the target background shown in the target image, the fraudulent background shown in the reference image, and the fraud date and time.

3. The image processing system according to claim 1, wherein the at least one processor is configured to acquire the number of times of fraud associated with the reference image, and wherein the at least one processor is configured to estimate the fraud based further on the target background shown in the target image, the fraudulent background shown in the reference image, and the number of times of fraud.

4. An image processing system, comprising at least one processor configured to:

acquire a target image showing a target foreground that is a foreground being an estimation target for fraud and a target background being a background of the target foreground;

acquire a reference image showing a reference background being a background for reference, estimate fraud relating to the target foreground based on the target background shown in the target image and the reference background shown in the reference image;

identify a target background type being a type of the target background, acquire, from a reference image database in which a reference background type being a type of the reference background and the reference image are associated with each other, the reference image having the same reference background type as the target background type; and wherein the at least one processor is configured to estimate fraud using a Gabor filter to calculate a pattern similarity between the target image and the reference background.

5. The image processing system according to claim 1, wherein the at least one processor is configured to identify a target foreground type being a type of the target foreground, and wherein the at least one processor is configured to acquire, from a reference image database in which a reference foreground type being a type of the reference foreground that is a foreground corresponding to the reference background and the reference image are associated with each other, the reference image having the same reference foreground type as the target foreground type.

6. An image processing system, comprising at least one processor configured to:

acquire a target image showing a target foreground that is a foreground being an estimation target for fraud and a target background being a background of the target foreground; and estimate fraud relating to the target foreground based on the target background shown in the target image;

acquire a first score relating to the fraud based on the target background shown in the target image and a first evaluation method;

acquire a second score relating to the fraud based on the target background shown in the target image and a second evaluation method different from the first evaluation method; and estimate the fraud based on the first score and the second score; and wherein the first evaluation method comprises using a Gabor filter to calculate a pattern similarity between the target image and the reference background.

7. The image processing system according to claim 6, wherein the first evaluation method is a method based on a pattern of the target background, and wherein the second evaluation method is a method based on a color of the target background.

8. The image processing system according to claim 6, wherein the at least one processor is configured to:

calculate a final score based on the first score and the second score; and estimate the fraud based on the final score.

9. The image processing system according to claim 1, wherein the at least one processor is configured to:

acquire a plurality of target regions in which the target background is shown from the target image; and estimate the fraud based on the target background shown in each of the plurality of target regions.

10. The image processing system according to claim 1, wherein the at least one processor is configured to:

shape the target image such that the target foreground in the target image takes a predetermined shape; and estimate the fraud based on the target background shown in the shaped target image.

11. The image processing system according to claim 1, wherein the at least one processor is configured to cause a user terminal to display a guide for causing the target background to be shown in the target image to a certain extent, and wherein the at least one processor is configured to acquire the target image captured by the user terminal under a state in which the guide is displayed.

12. The image processing system according to claim 1, wherein the target foreground is a subject captured by a photographing unit, and wherein the target background is another object on which the subject is placed.

13. The image processing system according to claim 1, wherein the target foreground is an identity verification document, and wherein the fraud is falsification of the identity verification document.

14. The image processing system according to claim 1, wherein the at least one processor is configured to estimate fraud using the Gabor filter to calculate the pattern similarity between the target image and the reference background for each reference background, and wherein there are 1000 or more reference backgrounds.

15. The image processing system according to claim 1, wherein the at least one processor is configured to estimate fraud using a color histogram comparison to calculate a color similarity between the target image and the reference background.

* * * * *